United States Patent [19]

Schlueter et al.

[11] 4,344,271

[45] Aug. 17, 1982

[54] HEAD ASSEMBLY FOR A COTTON HARVESTER

[75] Inventors: Francis E. Schlueter; Brian E. Kent, both of Des Moines, Iowa

[73] Assignee: Deere & Company, Moline, Ill.

[21] Appl. No.: 266,875

[22] Filed: May 26, 1981

[51] Int. Cl.³ .................. A01D 55/26; A01D 46/08
[52] U.S. Cl. .................. 56/13.6; 56/DIG. 9; 56/28
[58] Field of Search .................. 56/28–50, 56/13.6, DIG. 9

[56] References Cited

U.S. PATENT DOCUMENTS

| | | | |
|---|---|---|---|
| 3,327,840 | 6/1967 | Wilkes | 198/213 |
| 3,327,840 | 6/1967 | Wilkes | 198/213 |
| 3,785,130 | 1/1974 | Gaeddert | 56/DIG. 9 |
| 3,894,384 | 7/1975 | Lolkema | 56/35 |
| 3,977,164 | 8/1976 | Ashton | 56/14.5 |
| 4,249,365 | 2/1981 | Hubbard et al. | 56/13.2 |

OTHER PUBLICATIONS

Operator's Manual OM-H109002, Issue 10, Harvester Works, 40 Series, Corn Heads.

*Primary Examiner*—Robert A. Hafer

[57] ABSTRACT

A head assembly for a cotton harvesting machine which provides many combinations of row widths and various row harvesting capacities. The head assembly includes a main cross auger frame with row unit support structure which slidably receives a plurality of vertically adjustable row units. The support structure permits simultaneous transverse adjustment of each individual row unit and its associated hydraulic lift cylinder. An extension frame is provided for adding extra row units for increased capacity or accommodating widely spaced rows of cotton. Row units and lift cylinders are freely slidable between the main frame and the extension, and the extension is removable to lessen machine width during transport. The main cross auger frame includes a pair of transversely spaced bearings which journal opposite ends of a main cross auger. An auger extension is attached to a shaft which extends through the extension end bearing to eliminate need for relocating the bearing or providing a telescoping auger.

25 Claims, 13 Drawing Figures

HEAD ASSEMBLY FOR A COTTON HARVESTER

BACKGROUND OF THE INVENTION

The present invention relates generally to a crop harvester and more specifically to a harvesting head assembly for a cotton harvester.

Farmers, particularly those raising cotton, are continually trying different spacings between crop rows and require a harvester having row harvesting units which are transversely adjustable to accommodate the various row spacings. The harvesting capacity of the machine may vary from two to four rows depending on the width of the harvesting head assembly and the spacing between the rows which in cotton typically varies from 30 to 40 inches. To accommodate up to six rows, or four rows planted in a skip row pattern, the head assembly must be substantially wider than that required for harvesting two or three rows, or four narrowly spaced rows planted in a solid planting pattern.

Providing a single head assembly to accommodate all of the numerous combinations of row spacings and row harvesting capacities including four or more rows is not practical since the head would be too wide for conveniently transporting the harvester to and from the field. The farmer wanting two or three row capacity, or four row capacity in fields with narrowly spaced rows, does not want the added cost, weight and inconvenience of a head which is wider than he requires. Providing a separate head assembly for each of the required widths results in increased manufacturing and distribution costs, and prevents the farmer from later increasing the row capacity of his machine or the row spacing of his crop unless he buys a wider head for his harvester. The wider head assemblies are difficult to ship from the factory to the farmer and are inconvenient to handle.

In the past, self-propelled cotton strippers having head assemblies with transverse cross auger frames have been widened by adding an extension to the main cross auger frame. A telescoping cross auger accommodates the changes in width of the cross auger frame as a result of adding the extension. The telescoping auger can easily bind and become difficult to extend and retract. The journal supporting the auger at the extension end of the main auger frame has to be removed or relocated to permit extension of the auger. Adding the extension is a difficult and time-consuming task.

The row units, which are supported from the cross auger frame, may be transversely adjusted on the frame, but such adjustment requires that the lift cylinder extending between the lower portion of the frame and the unit be relocated on the row unit. The cylinder, which is part of an automatic height control system for maintaining the row unit the proper distance above the ground, usually has to be disconnected from the unit during each transverse adjustment. Alternatively, a large transverse pin is located on the lower portion of the row unit and is slidably received by the upper end of the cylinder while the lower end of the cylinder is transversely fixed on the frame. Such assemblies permit only limited transverse adjustments of each row unit, and the adjustments cannot be made easily and conveniently. If the cylinder is not aligned properly, it can bind and malfunction.

SUMMARY OF THE INVENTION

It is, therefore, an object of the present invention to provide a head assembly for a crop harvester which overcomes the aforementioned problems.

It is another object of the invention to provide a head assembly for a crop harvester which easily and conveniently accommodates numerous combinations of crop row spacings and harvesting row capacities.

It is still another object of the invention to provide a head assembly with a main transverse frame which has a relatively narrow transport width, but which can be easily and conveniently extended to provide additional row capacity or to accommodate widely spaced rows.

It is still a further object to provide a transverse head assembly which includes individual row units which may be transversely adjusted on a main frame with greater ease and convenience than with previously available head assemblies. It is another object to provide such an assembly which can be widened with an extension frame and wherein the row units are freely transversely adjustable on both the main and extension frames.

It is a further object of the invention to provide a head assembly for a cotton harvester which can receive up to six row units.

It is yet another object of the invention to provide an improved extensible head assembly for a cotton harvester. It is a further object to provide such an assembly with an improved cross auger extension.

It is a further object to provide a head assembly for a cotton harvester which provides the harvester with an improved shipping configuration. It is another object to provide such a head assembly with a basic main head and an extension, wherein at least four row units can be narrowly spaced on the main head for shipment and thereafter the extension can be added to the head to either space the units further apart or add one or more row units to increase the row harvesting capacity to up to six rows.

It is still another object of the invention to provide a head assembly for a cotton harvester including a basic main cross auger frame which can be utilized with numerous combinations of row spacing and row capacities, and including an extension frame or frames which may be selectively added easily and conveniently to provide increased row capacity and/or to accommodate widely spaced rows or rows planted in a skip row pattern so that the basic cross auger frame may be utilized for all possible combinations. It is a further object to provide such a head assembly with row units and height control cylinders that are easily adjusted transversely.

In accordance with the above objects, a head assembly is provided which includes a main cross auger frame with row unit support structure including a transverse beam which slidably receives up to four row units which each have a lower hydraulic lift cylinder automatically controlled to maintain the unit at the proper distance above the ground. The support structure permits both the row unit and its associated lift cylinder to be transversely adjusted on the cross auger frame without need to disconnect the cylinder from the unit. In one embodiment of the invention, the cylinder is attached to a bracket which slides on a lower transverse member which is connected to the auger frame and extends parallel to the transverse beam. In another embodiment, the bracket supporting the row unit on the cross auger frame carries mounting structure connected to the cylinder. Cross auger frame extensions are provided for adding extra row units for increased row capacity or for accommodating a plurality of rows of cotton spaced a total distance which is greater than the width of the main cross auger frame. Row units and their associated lift cylinders are freely slidable between the main frame and the extensions. During transport, up to four row units may be supported on the main frame, and the extension may be removed to provide a narrow, compact shipping configuration. Production costs are lessened since a single main cross auger frame construction can be utilized for numerous row configurations and machine harvesting capacities. The main cross auger frame includes permanently mounted bearings which journal opposite ends of a main cross auger. Auger extensions are attached to a shaft which extends through the bearing which supports the end of the main auger adjacent to the extension end of the main cross auger frame. Telescoping augers are thereby not needed, and problems involved with such augers, such as binding and inadequate axial support when telescoped, are reduced or eliminated.

These and other objects, features and advantages will become apparent upon a reading of the detailed description which follows taken with the drawings.

DESCRIPTION OF THE PREFERRED EMBODIMENT

Figure 1:
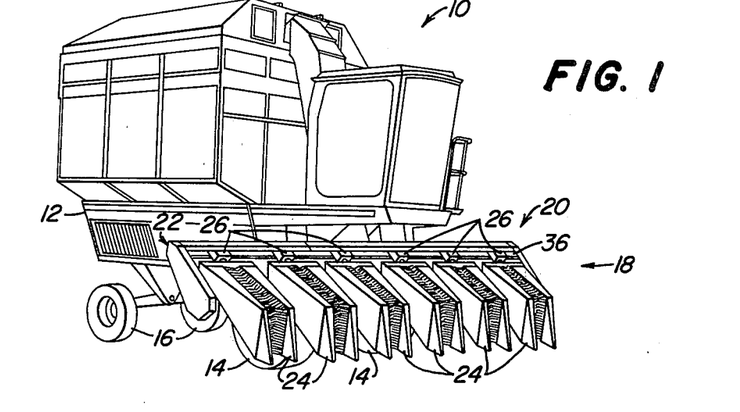
FIG. 1 is a front perspective view of a cotton harvester with the head assembly of the present invention attached.

Referring now to FIG. 1 therein is shown a self-propelled cotton harvester 10 including a fore-and-aft extending main frame 12 supported for forward movement through a field of cotton by forward drive wheels 14 and rear steerable wheels 16. A harvesting head assembly indicated generally at 18 is supported from the main frame 12 ahead of the drive wheels 14. The harvester 10, with the exception of the head assembly 18, is generally of conventional construction and is of the type utilized with the commercially available four-row self-propelled John Deere 484 Cotton Stripper.

As seen in FIG. 1, the head assembly 18 includes a transverse cross auger frame 20 and a transverse cross auger frame extension 22 which supports a plurality of transversely adjustable row units 24 of the brush roll type described in copending application of Francis E. Schlueter, Ser. No. 266,877, entitled ROW UNIT FOR A COTTON HARVESTER, filed concurrently herewith and incorporated herein by reference. In the preferred embodiment, as many as six row units 24 may be spaced across the auger frame 20 and frame extension 22 to receive a like number of rows of cotton plants. Each row unit 24 includes stripper or brush rolls and unit augers (not shown) driven by a unit drive 26. The unit drives 26 are transversely adjustable on the frame 20 and frame extension 22 for fore-and-aft alignment with the drive inputs on the corresponding row units 24. The unit drives 26 are operably connected to a conventional engine-driven belt drive system (not shown) which also drives a cross auger 30 (FIGS. 7 and 8) through a drive assembly 32 located on the left end of the head assembly 18 (as viewed by the operator looking forwardly over the head assembly).

Figure 2:
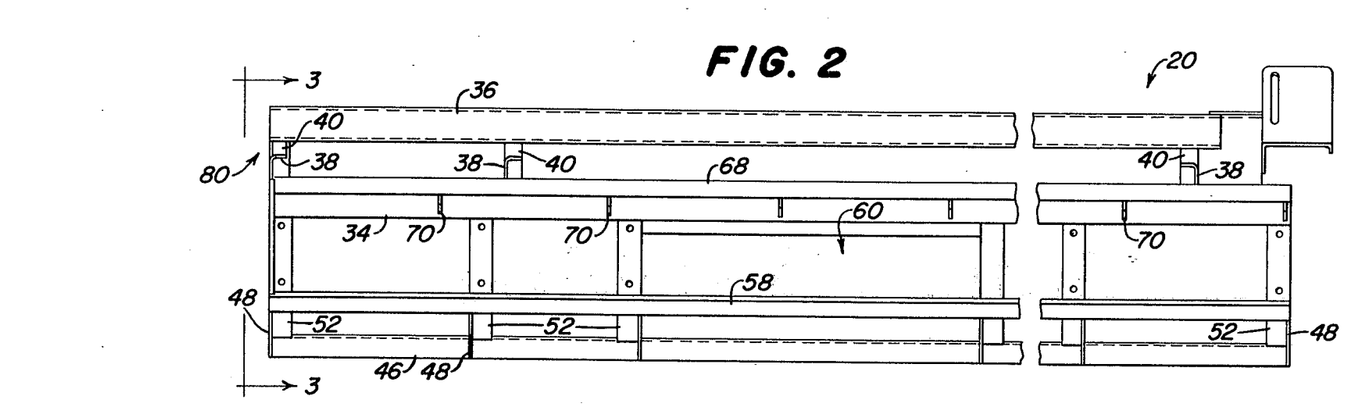
FIG. 2 is a front view of the main cross auger frame for the head assembly shown in FIG. 1.
Figure 3:
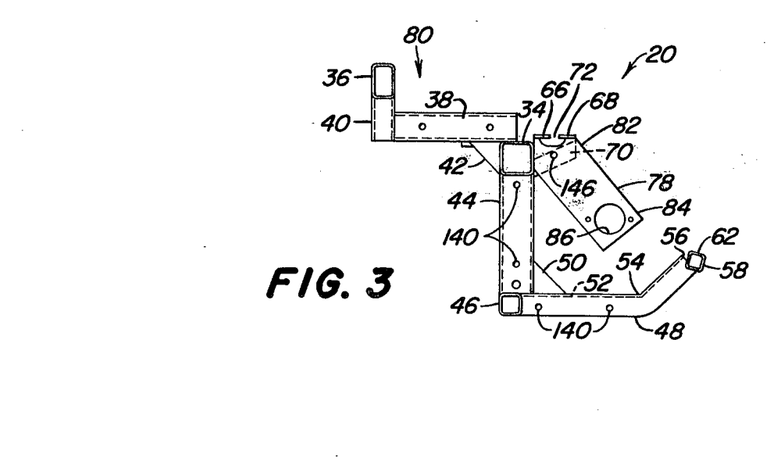
FIG. 3 is a view taken along lines 3—3 of FIG. 2.

The main cross auger frame 20, as best seen in FIGS. 2 and 3, includes a square tubular transverse beam 34 connected to an upper rectangular tubular beam 36 by a plurality of inwardly opening channel-shaped members 38 and upright members 40. The members 38 extend rearwardly from the top face of the beam 34. The members 40 form a right angle connection with the members 38 and are connected to the bottom of the beam 36. Triangular plates 42 are welded between the rear face of the beam 34 and the bottom flange of the member 38. Inwardly opening channel-shaped support posts 44 are welded to and extend downwardly from the bottom face of the beam 34. A square tubular beam 46, smaller in cross section than the beam 34, is welded to the bottom of the posts 44. Angles 48 are welded to the square beams 46 and the bottom of the posts 44 and extend forwardly and upwardly therefrom as best seen in FIG. 3. Triangular plates 50 are welded between the front flange of the posts 44 and top flanges 52 of angles 48. Each angle 48 is angled upwardly at 54 and terminates in a forward end 56 which carries a transverse tubular beam 58. The beam 58 extends transversely along the front of cross auger trough area 60 and includes an upwardly and forwardly directed face 62. In an alternative embodiment (FIG. 8), the cross auger frame 20 includes a transverse flange 64 extending forwardly from the lower portion of the trough area 60. Various other structures may also be utilized to provide a similar lower support surface.

Figure 8:
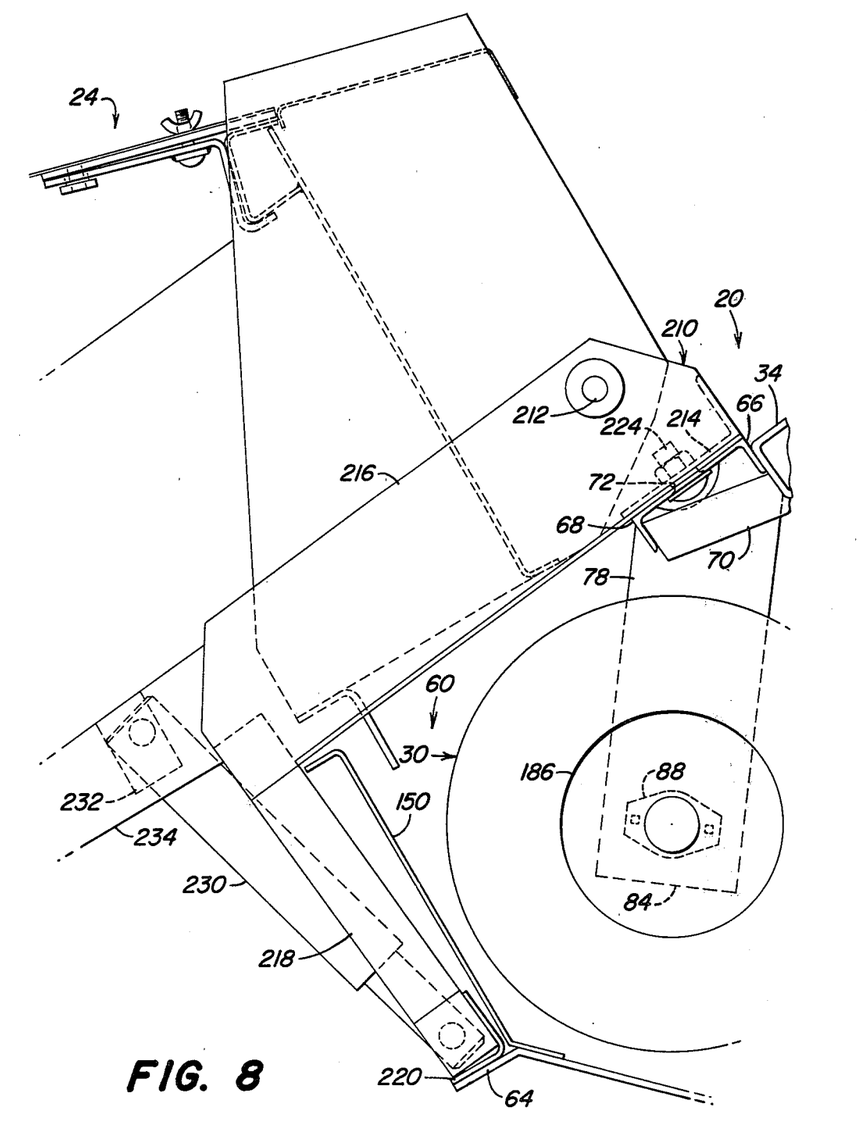
FIG. 8 is a detailed end view of the cross auger frame and showing one embodiment of the row unit support bracket and lift cylinder support structure.

A transversely extending angle member 66 is welded to the front face of the beam 34 (FIGS. 3 and 8). A second angle member 68 is supported forwardly of the member 66 by a plurality of transversely spaced brackets 70 welded to the member 68 and to the front face of the beam 34. The upper surfaces of the angle members define an upwardly directed support surface with a central transverse slot 72 extending substantially the entire width of the main cross auger frame 20. An upright hanger bracket 78 is connected to the right-hand or extension end 80 (as viewed by the operator looking forwardly over the head assembly) of the main cross auger frame 20. The bracket 78 has a generally rectangular shape and has an upper slotted end 82 welded to the ends of the beams 34 and to the members 66 and 68. A lower apertured free end 84 is located in the cross auger trough area 60. A circular aperture 86 is centered with respect to the axis of the cross auger 30. The bracket 78 carries a self-aligning auger bearing 88 (FIG. 8) in the aperture 86. The area of the bracket 78 as viewed in the direction of the auger axis (FIG. 8) is substantially less than the corresponding area of the trough 60. The free end 84 of the bracket 78 terminates just below the bearing aperture 86 and above the lower portion of the trough area 60. As will be discussed in detail below, the bracket 78 supports the extension end or right-hand side (as viewed by the operator) of the auger 30 in the trough area 60 in such a manner that when the extension 22 (FIG. 1) is added, cotton can be freely conveyed inwardly past the bracket. It should be noted here that the bracket 78 is substantially vertical when the cross auger frame is in the field-working position. As best seen in FIG. 2, the bracket 78 is flush with the extension end 80 of the cross auger frame 20 which is substantially parallel to a vertical fore-and-aft extending plane.

Figure 4:
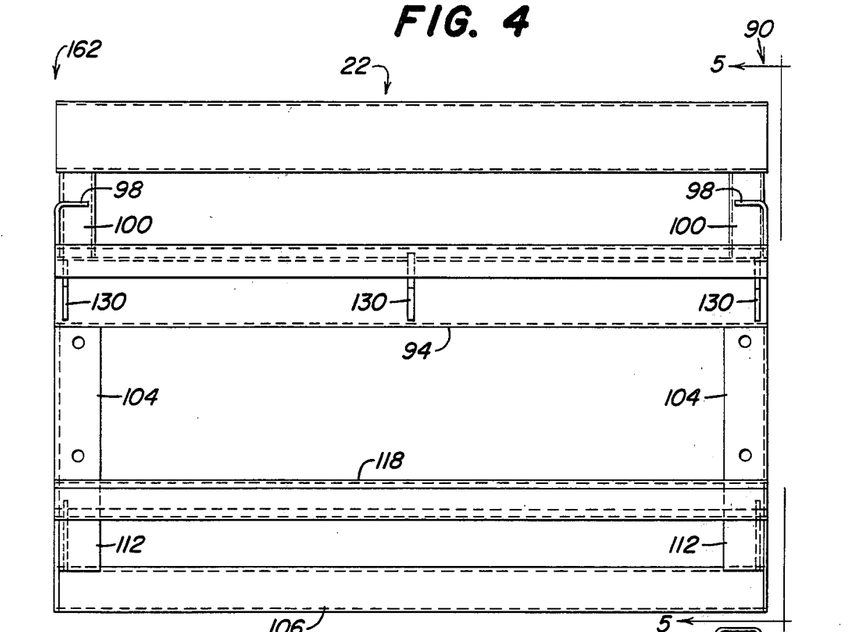
FIG. 4 is an enlarged front view of a cross auger extension
Figure 5:
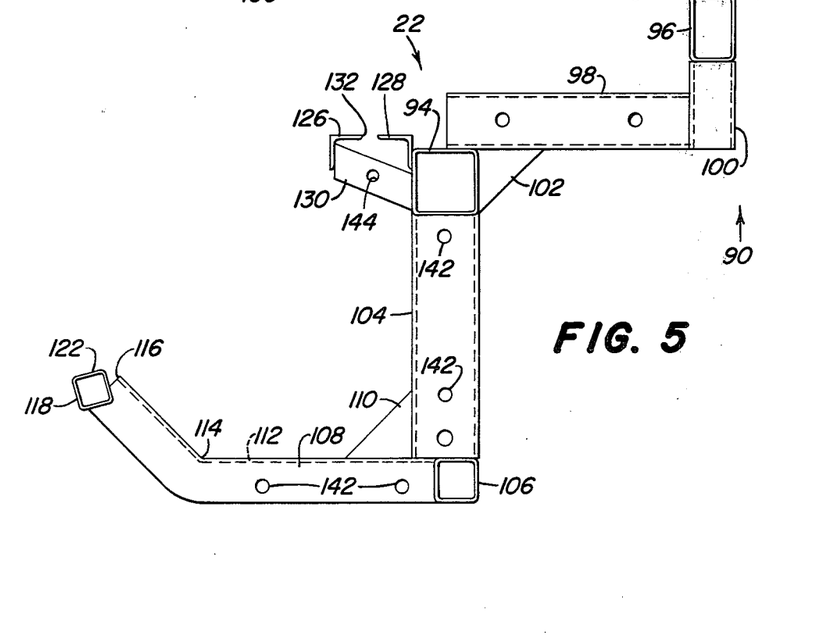
FIG. 5 is a view taken along lines 5—5 of FIG. 4.

The cross auger frame extension 22 (FIGS. 4 and 5) has an inboard end 90 which is substantially parallel to a vertical fore-and-aft extending plane and is generally identical in shape and size to the extension end 80. The extension 22 is similar in construction to the frame 20 and includes a square tubular transverse beam 94 connected to an upper rectangular tubular beam 96 by a plurality of inwardly opening channel-shaped members 98 and upright members 100. Plates 102 are welded between the rear face of the beam 94 and the bottom flange of the member 98. Inwardly opening channel-shaped support posts 104 are welded to and extend downwardly from the bottom face of the beam 104. A square tubular transverse beam 106 is welded to the bottom of the posts 104. Angles 108 are welded to the beams 106 and the bottom of the posts 104 and extend forwardly and upwardly therefrom. Plates 110 are welded between the front flanges of the posts 104 and top flanges 112 of angles 108. Each angle 108 is angled upwardly at 114 and terminates in a forward end 116 which carries a transverse tubular beam 118. Alternatively, the forward end 116 can carry a flange similar to that shown at 64 in FIG. 8 to provide a forwardly and upwardly directed surface, such as shown at 122 in FIG. 5.

A pair of angle members 126 and 128 are supported by brackets 130 from the beam 94 in a manner generally identical to that described above for the members 66 and 68 to provide a transversely extending support surface with a central slot 132. The extension 22 can be constructed with various transverse dimensions to accommodate the desired overall width of the harvesting head assembly 18. Alternatively, two or more extensions may be joined end to end and connected to the extension end 80 of the frame 20.

To extend the width of the head assembly 18 beyond the width of the frame 20, the end 90 of the extension 22 is abutted against the extension end 80 of the frame 20. The extension 22 is secured to the frame 20 by bolts 138 (FIG. 7) which pass through mating holes 140 and 142 in ends 80 and 90 respectively. A spacer (not shown) is inserted between the bracket 130 adjacent the end 90 (FIG. 5) and the vertical bracket 78 located at the end 80 and a bolt is passed through the spacer and holes 144 and 146 in the respective brackets. The angles 126 and 128 and the slot 132 of the extension 22 are transversely aligned with the angles 66 and 68 and the slot 72 of the frame 20 to form a continuous upper slotted surface extending substantially the width of the extended head assembly 18. The beams 94, 96, 106 and 118 of extension 22 are transversely aligned with the beams 34, 36, 46 and 58, respectively, of the frame 20. The beams 118 and 58 form a continuous lower support surface generally coextensive with, and parallel to, the upper slotted surface.

Figure 6:
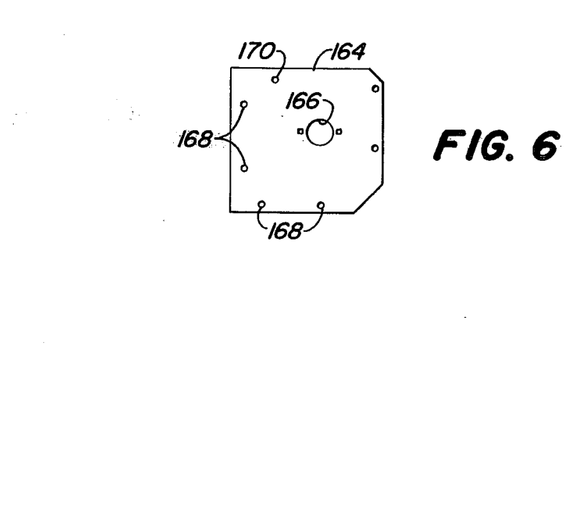
FIG. 6 is a plan view of the end sheet utilized with the extension of FIGS. 4 and 5.

Conventional panel structure 150 (FIGS. 7 and 9) is attached to the cross auger frame 20 to enclose the trough area 60. Likewise, panel structure 152 is connected to the cross auger frame extension 22 to enclose extension trough area 160. The outboard end 162 (FIG. 4) of the extension 22 is substantially identical to the end 90 (FIG. 5) and receives an end panel sheet 164 (FIG. 6) having an aperture 166 for mounting a self-aligning extension auger bearing 167 similar to the bearing shown at 88 in FIGS. 7 and 8. The panel 164 is attached to the end 162 by bolts inserted through holes 168 and 170 in the panel and through corresponding holes located in the angle 108, member 104 and bracket 130. A spacer (not shown) is provided between the outboard bracket 130 and the panel at hole 170 because the bracket is offset inwardly from the end of the extension 22.

When the extension 22 is attached to the frame 20, the aperture 166 is axially aligned with the vertical bracket aperture 86 (FIG. 7) as well as with aperture 176 located in cross auger left-hand end structure 178. A self-aligning bearing 180 is located in the aperture 176. A transverse main shaft 182 is journalled for rotation in the bearings 88 and 180. The left-hand end of the shaft 182 extends outwardly beyond the end structure 178 and supports a pulley 183 which is part of the drive assembly 32. The opposite end of the shaft 182 extends through the bearing 88 and outwardly beyond the end 80. A pair of disks 184 are supported on the shaft 182 inwardly adjacent the bearings 88 and 180. The disks 184 are constrained to rotate with the shaft 182 and support a central auger tube or cylinder 186 for rotation about the shaft axis between the end 80 and the end structure 178. Flighting 188 (FIG. 8) is connected to the tube 186 for directing cotton inwardly toward a central discharge location. When the harvesting head assembly 18 is utilized without an auger extension 22, end structure (not shown) is connected to the extension end 80, and a cover is attached to the end 80 of the cross auger to shield the right-hand end 190 of the shaft.

Figure 7:
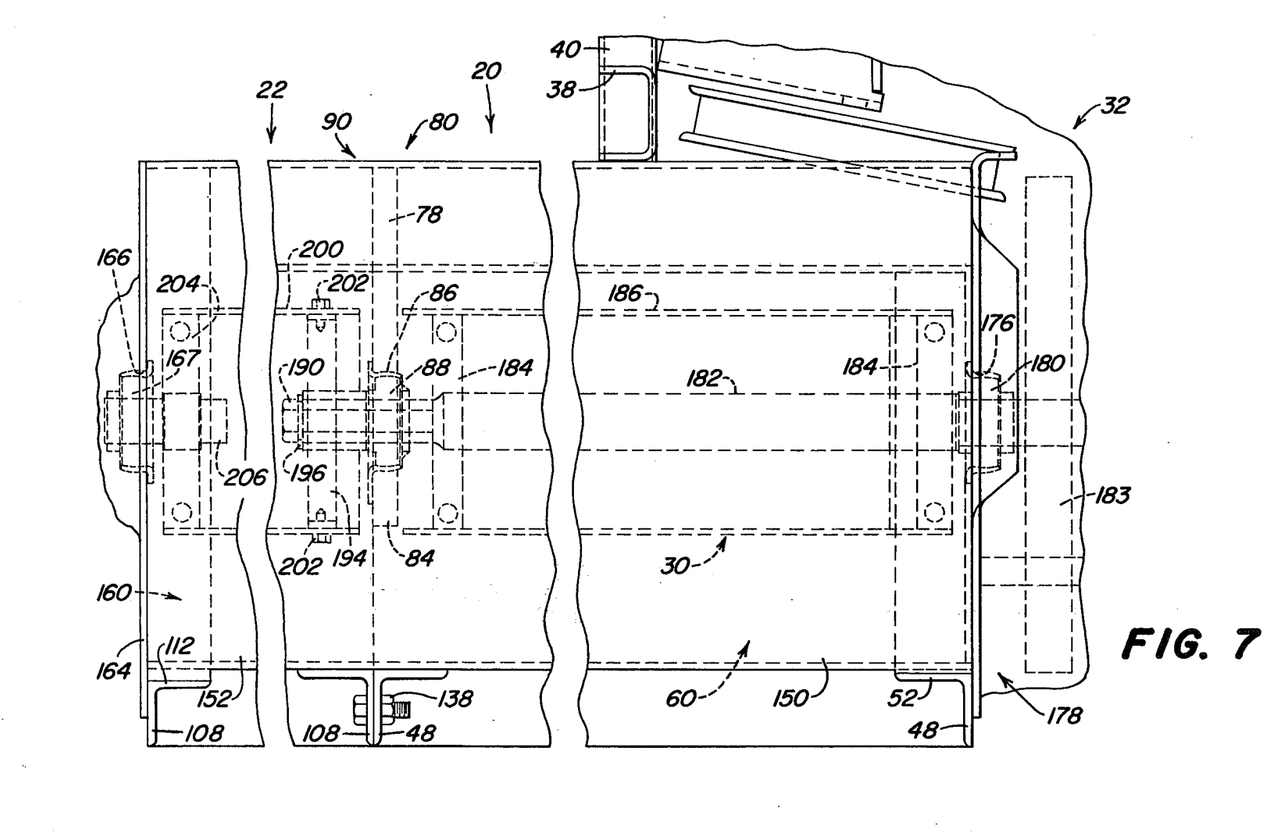
FIG. 7 is a view of a portion of the cross auger assembly with the extension attached and showing the connection of the auger extension to the main cross auger.

When the head assembly 18 is utilized with an extension 22, the end 190 projects into the trough area 160 adjacent the end 90 of the extension (FIG. 7). A support disk 194 is carried loosely on the end 190 of the shaft between the bearing 88 and a snap ring 196. The disk 194 is mounted for rotation with the shaft 182 and supports an auger tube 200 which is connected to the disk by tap screws 202 and extends between the vertical bracket 78 and the outboard end 162 of the extension 22. The outboard end of the tube 200 is connected to a similar disk 204 mounted for rotation with a support shaft 206 extending through the bearing 167 in the aperture 166. Flighting is attached to the tube 200 to convey cotton inwardly toward the main cross auger 30. The auger tubes 186 and 200 are the same diameter and concentric with the shaft 182. The auger 30 has adequate capacity to handle the cotton from the maximum number of row units 24, which in the preferred embodiment is six.

As seen in FIG. 8, each row unit 24 is pivotally connected for rocking about a transverse axis by pins 212 to a unit support bracket indicated at 210. The unit support bracket 210 is slidably supported on the angles 66 and 68 of the cross auger frame 20 (or the angles 126 and 128 of the extension 22). The bracket 210 includes a flat connecting portion 214 (FIG. 11) and a pair of upright sidewalls 216 spaced on opposite sides of the row unit. In the embodiment shown in FIG. 8, the sidewalls 216 extend forwardly beyond the front of the cross auger. A pair of downwardly converging support members 218 are welded to the respective sidewalls 216. An angle 220 is welded to the lower ends of the members 218. A pair of apertured upright plates 222 are transversely spaced on the angle 220 to form a pivot bracket. A pair of bolts 224 (FIG. 8) are inserted through the slot 72 (or the slot 132) and through holes 226 in the connecting portion 214 and are tightened to maintain the bracket 210 and the row unit 24 in the desired location along the auger frame 20 (or the extension 22). The rod end of a hydraulic cylinder 230 is pinned to the plates 222, and the anchor end is connected to a cylinder bracket 232 located on lower shell assembly 234 of the row unit 24. The lower flange of the angle 220 is supported on the flange 64. The cylinder 230 is connected to a source of hydraulic pressure on the harvester chassis and is controlled through a conventional height-sensing system. As the cylinder 230 is extended and retracted in response to variations in ground contour, the row unit 24 is rocked up and down about the axis of the pins 212 to maintain the front of the unit the proper distance above the ground. In the preferred embodiment, a closed center hydraulic system is utilized to facilitate adding row units 24 to or removing row units from the harvesting head assembly 18.

By loosening the bolts 224, the bracket 210 with its associated row unit 24 and lift cylinder 230 can be slid transversely along the cross auger frame 20 and extension 22. The continuous slotted upper support surface provided by the angles 66, 68 and 126, 128 supports the connecting portion 214 and permits the row unit 24 to be transversely relocated without removing the bolts 224 or disconnecting the unit from the frame. The flange 64, or alternatively the forward beam 58, supports the angle 220 so that the lower connecting structure for the cylinder 218 can be slid transversely with the row unit 24 for proper alignment therewith to prevent binding.

Figures 9, 10, 11:
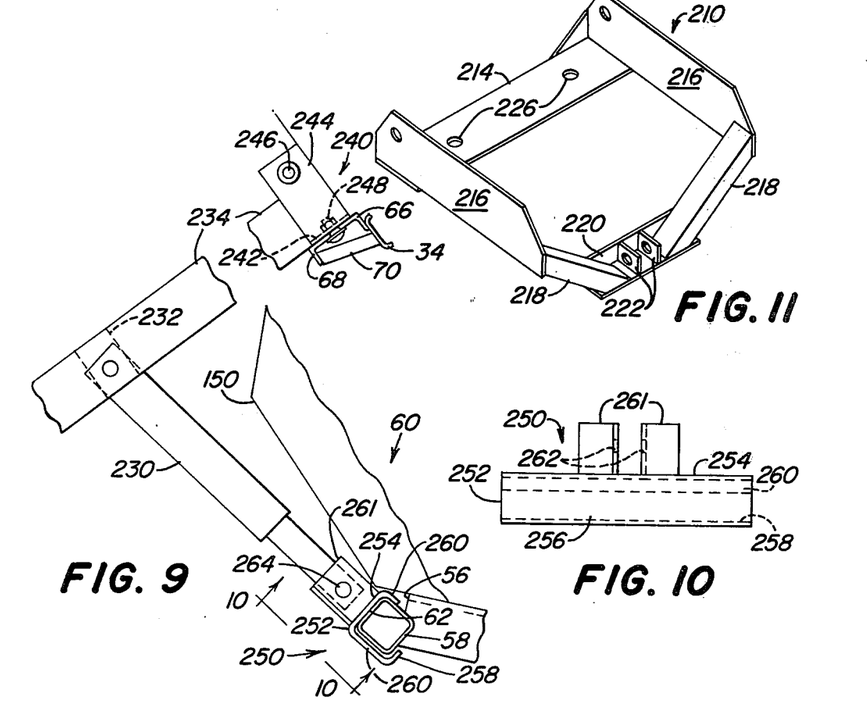
FIG. 9 is a view similar to FIG. 8, but showing an alternate embodiment of the lift cylinder support structure.
FIG. 10 is a front view of the bracket shown in FIG. 9.
FIG. 11 is a perspective view of the support bracket and lift cylinder support structure of FIG. 8.

In the embodiment shown in FIGS. 9 and 10, the bracket 240 is essentially as described in the aforementioned application, Ser. No. 266,877, by Francis Schlueter incorporated herein by reference. This embodiment is simpler and less costly to manufacture than that shown in FIGS. 8 and 11, and, therefore, is preferred. The bracket 240 is U-shaped and has a bight portion 242 which is supported by the surface provided by angles 66, 68 and 126, 128. Upright apertured sidelegs 244 extend upwardly from the bight portion 242 and receive pivot pins 246 for supporting the row unit 24 for rocking with respect to the bracket 240 about a transverse axis. A pair of bolts 248 which extend through holes in the bight portion 214 and through the slot 72, 132 are tightened to secure the bracket 240 on the angles 66, 68 and/or 126, 128. The hydraulic cylinder 230 is pinned at its anchor end to the lower shell assembly bracket 232 and at its rod end to a freely sliding bracket 250 supported on the beam 58. The bracket 250 includes an angle 252 with an upper portion 254 which is supported by the surface 62 and a forward portion 256 having a flange 258 bent back parallel to the upper portion 254. The portion 254 includes a downturned flange 260 which cooperates with the flange 258 to maintain the bracket 250 on the beam 58. The angle 252 fits sufficiently loosely on the beam 58 so that it can slide freely therealong as the cylinder 230 is moved transversely with the row unit 24. A pair of upright angles 261 are welded to the top portion 254 of the angle 254 and are apertured at 262 to receive transverse rod end pin 264. When the two bolts 248 are loosened, the bracket 240 with the row unit 24 can be repositioned transversely, and the sliding bracket 250 permits the cylinder 230 to easily move with the row unit without need to remove the cylinder or relocate the anchor-end connection on the lower shell assembly 234. Proper cylinder alignment is maintained simply and reliably during transverse adjustments of the row unit 24. Since the angles 66, 68 and 126, 128 form a continuous slotted support surface and the beams 58, 118 provide a continuous bracket support surface across substantially the entire width of the extended cross auger frame, the row unit 24 can be freely moved transversely between the main cross auger frame 20 and the extension 22 to the desired location. Once the row unit 24 is in position, the bolts 224 (FIG. 8) or 248 (FIG. 9) are tightened, and the unit drive 26 is adjusted for proper fore-and-aft alignment with row unit and is connected to drive the brush roll harvesting mechanisms and row unit augers in the unit from the belt drive system.

Figure 12:
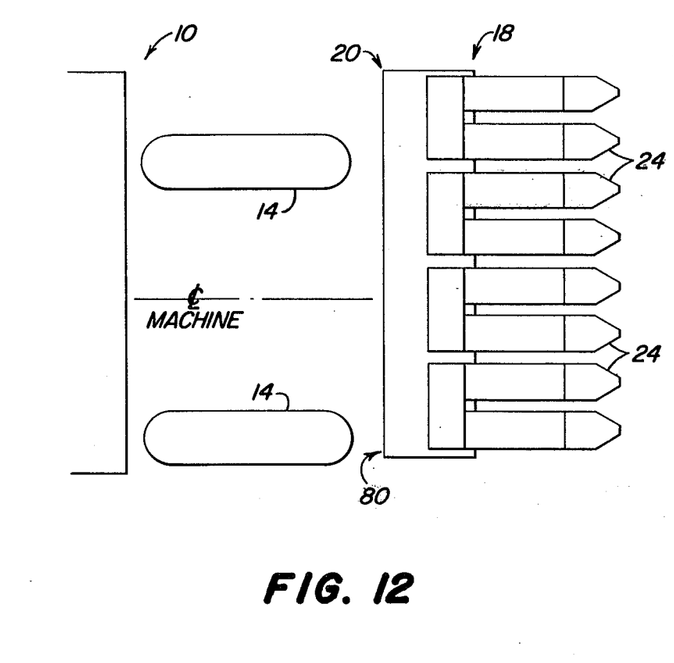
FIG. 12 is a schematic representation of a cotton harvester with the basic cross auger frame attached and in the transport configuration or the narrowly spaced four row harvesting configuration.
Figure 13:
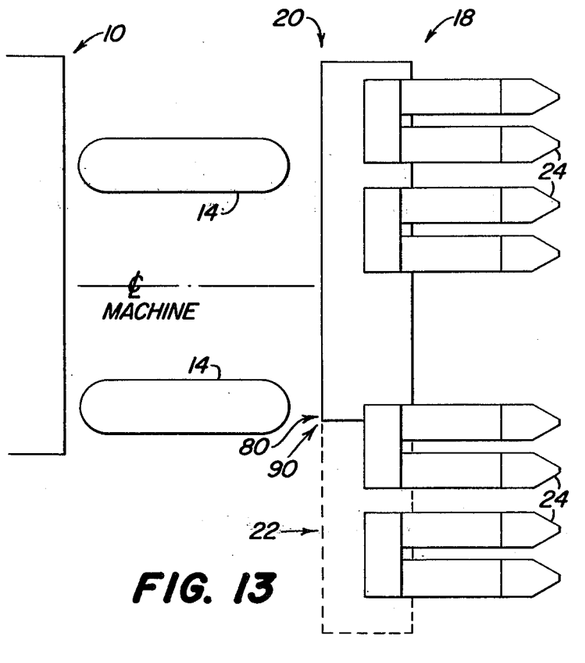
FIG. 13 is a schematic representation of a cotton harvester similar to that shown in FIG. 12, but with an extension attached and with the row units transversely adjusted for harvesting four rows of cotton planted in a skip pattern.

In the preferred embodiment, the main cross auger frame 20 is generally the same width as the harvester chassis (see FIG. 12) and is supported forwardly of the drive wheels by a conventional hydraulic lift assembly so that the frame 20 is generally coextensive with the chassis, or in other words, the ends of the frame 20 are generally aligned with the transverse extremities of the remainder of the harvester 10, to provide a compact shipping arrangement. Two, three or four transversely adjustable row units 24 may be mounted on the frame 20 for shipment with the harvester 10. Once the harvester is shipped to the dealer or farmer, this basic head assembly 18 (FIG. 12) may be easily converted to other row combinations by adding an extension or extensions 22 (FIG. 13) and sliding the row units 24 with their associated lift cylinders 230 to the desired transverse locations for a given row spacing or row pattern. By way of example only, the basic head assembly 18 of FIG. 12 may be set up for shipping as a complete machine ready for harvesting four rows of cotton spaced 30 inches apart. If a particular customer requires a machine capable of harvesting four rows of cotton planted in a skip-row pattern, the harvester 10 is shipped as shown in FIG. 12 along with an extension 22. When the harvester reaches the dealer or farmer, the extension 22 is bolted to the main cross auger frame, and the row units 26 are then transversely adjusted to the proper locations to match the skip-row pattern (FIG. 13). If necessary, the wheels 14 are adjusted to run between the rows.

Examples of combinations available for use with the basic frame 20 include three-row unit capacity spaced for 36-, 38- or 40-inch rows and four-row unit capacity for 30-inch rows. Examples of combinations available for use with an extended frame include four- or fiverow unit capacity spaced for 32-, 36-, 38- or 40-inch rows, and six-row unit capacity (FIG. 1) spaced for 30- or 32-inch rows, as well as various skip-row pattern combinations. When more row units 24 are required than can be shipped assembled on the main cross auger frame 20 (i.e., more than four units for the embodiment shown in FIG. 12), the additional units are shipped with the extension or extensions 22.

Having described the preferred embodiment, it will be apparent that modifications can be made without departing from the scope of the invention as defined in the accompanying claims.

We claim:

1. In a framed crop harvester adapted for forward movement over a field of row crops, a transverse harvesting head assembly comprising: a main cross auger frame supported by the harvester frame and having first and second transversely spaced ends; first and second bearings supported by the main cross auger frame adjacent the first and second ends, respectively; a main cross auger journalled for rotation about a generally horizontal axis by the bearings between the first and second ends; a transverse extension frame selectively attachable to and removable from the second end of the main cross auger frame; means for releasably securing the extension frame to the second end and extending the width of the harvesting head assembly beyond the width of the main cross auger frame; a third bearing supported by the extension frame adjacent its outermost end; a transverse auger extension; means for journalling the auger extension in the second and third bearings, when the extension frame is secured to the second end, for rotation with the main cross auger; and row harvesting means selectively attachable to, and transversely adjustable with respect to the main cross auger frame and extension frame, wherein the main frame includes row unit support structure and the row harvesting means comprises a plurality of individual vertically adjustable row units slidably supported by the unit support structure for transverse adjustment to accommodate different row spacings, and wherein the extension frame includes complementary support means for forming an extension of the unit support structure, when the extension frame is attached, and permitting the row units to be slid transversely between the main cross auger frame and the extension frame.

2. The invention as set forth in claim 1 wherein the main cross auger includes a central shaft supported by, and extending axially through the second bearing, and the auger extension includes an inner end adjacent the second bearing and means for releasably securing said inner end to the central shaft for rotation therewith about the axis.

3. The invention as set forth in claim 1 or 2 further comprising an elongated bracket located inwardly adjacent the second end and connected at one end to the main cross auger frame and extending therefrom toward the axis to a free end, wherein the second bearing is supported at the free end of the bracket.

4. The invention as set forth in claim 3 wherein the main cross auger frame defines a transversely extending crop-receiving trough having a predetermined cross-sectional area, and wherein the corresponding cross-sectional area of the elongated bracket is substantially less than said first-mentioned area and wherein said one end of the elongated bracket is located above the free end.

5. The invention as set forth in claim 1 wherein the row unit support structure includes generally transverse horizontal beam structure, wherein the head assembly further comprises a hydraulic cylinder connected at one end to the row unit and slidably supported at its opposite end by the beam structure for movement therealong as the row unit is transversely adjusted.

6. The invention as set forth in claim 1 wherein each row unit includes a fore-and-aft extending harvesting compartment, and wherein the head assembly further comprises a bracket member pivotally connected about a transverse horizontal axis to the aft end of the row unit, said bracket member extending forwardly from the pivotal axis to a cylinder support offset vertically from the row unit, extensible and retractable hydraulic cylinder means connected between the cylinder support and the row unit for rocking the latter vertically with respect to the bracket member, said bracket member being supported by the unit support structure when the row unit is located between the first and second ends and by the complementary support means when the row unit is adjusted outwardly beyond the second end.

7. In a framed crop harvester adapted for forward movement over a field of row crops, a transverse harvesting head assembly comprising: a transverse main frame supported above the ground by the harvester frame and including a generally horizontal first support structure extending substantially the width of the main frame and a second support structure parallel to but offset from the first structure and coextensive therewith; a bracket carried by and transversely adjustable with respect to the support structure; a fore-and-aft extending row unit pivotally supported adjacent its aft end by the bracket for rocking vertically about a generally transverse horizontal axis, said row unit movable transversely with the bracket as the latter is adjusted; extensible and retractable hydraulic cylinder means connected at one end to and transversely movable with the row unit for rocking the row unit vertically; and cylinder support means adjustably supported on the second support and connected to the opposite end of the hydraulic cylinder for transverse movement therewith as the bracket and row unit are transversely adjusted.

8. The invention as set forth in claim 7 furthercomprising an extension frame selectively attachable to and removable from one end of the transverse main frame, and including structure forming, when the extension frame is attached to said main frame, a transverse extension of the first and second support structures, and wherein the bracket and cylinder support means are freely adjustable over generally the entire combined width of the first support structure and the transverse extension.

9. The invention as set forth in claim 7 or 8 further comprising means for securing the row unit support bracket in one of a plurality of locations along the first support structure.

10. In a framed crop harvester adapted for forward movement over a field of row crops, a transverse harvesting head assembly comprising: a transverse main frame supported above the ground by the harvester frame and including a generally horizontal support structure extending substantially the width of the main frame; a bracket carried by, and transversely adjustable with respect to, the support structure; a fore-and-aft extending row unit pivotally supported on the support structure by the bracket and rockable about a generally transverse horizontal axis, said row unit movable transversely with the bracket as the latter is adjusted; mounting structure slidably supported by the support structure and movable transversely with the bracket thereon; and extensible and retractible cylinder means connected between, and transversely movable with, the mounting structure and the row unit for rocking the latter about the axis.

11. The invention as set forth in claim 10 further comprising an extension frame selectively attachable to and removable from one end of the transverse main frame, and including structure forming, when attached to said main frame, a transverse extension of the support structure, and wherein the bracket and mounting structure are freely adjustable over generally the entire combined width of the support structure and transverse extension.

12. The invention as set forth in claim 10 or 11 further comprising means for securing the row unit support bracket in one of a plurality of locations along the support structure.

13. The invention as set forth in claim 10 or 11 wherein the support structure includes a transverse member having an upwardly directed planar surface; wherein the bracket comprises a U-shaped member including a planar bight portion supported above and parallel to the planar surface, and sidelegs extending upwardly from the bight portion on either side of the row unit; and wherein the mounting structure is connected to the U-shaped member and extends downwardly and forwardly therefrom to a position below the row unit forwardly of the pivotal axis.

14. The invention as set forth in claim 12 wherein the horizontal support structure includes first and second transverse support beams, said second beam parallel to and offset forwardly from the first beam; and wherein the bracket is slidably supported on the first beam and the mounting structure is slidably supported on the second beam.

15. The invention as set forth in claim 12 wherein the horizontal support structure includes a pair of fore-and-aft spaced transverse members defining an elongated slot extending generally the width of the main frame; and wherein the means for securing the row unit support includes a fastener extending through the slot.

16. The invention as set forth in claim 11 further comprising a transverse auger journalled for rotation between the ends of the main frame and including a shaft constrained to rotate therewith and extending transversely outwardly of said one end, and an auger extension, separate from said transverse auger, supported at least in part by said extension frame and drivingly connected at one end, when said extension frame is attached, to said outwardly extending end of the shaft for rotation therewith about the axis of the transverse auger.

17. In a framed crop harvester having a fore-and-aft extending chassis of predetermined width adapted for forward movement over a field of crops planted in parallel rows wherein the spacing between the rows may vary from field to field, a transverse harvesting head assembly supported on the harvester frame, comprising: a main transverse harvesting unit support frame having first and second ends and generally transversely coextensive with the harvester chassis; a plurality of individual row harvesting units for receiving a like number of rows of crop; means for supporting the row units on the main unit support frame and for transversely adjusting the individual units thereon between the first and second ends; and extension frame means selectively attachable to and removable from the second end of the main unit support frame for extending, when attached, said main frame and permitting at least one of the individual row units to be adjusted outwardly beyond the second end for receiving at least one row outwardly of the chassis, wherein said support frame and the extension frame means, when attached, define continuous support structure extending generally the width of the extended frame, and wherein the means for supporting the row units on the support frame includes a transversely adjustable bracket supported by, and movable along the width of, the continuous support structure.

18. The invention as set forth in claim 17 wherein at least one of the row units includes a hydraulic lift cylinder connected to and generally transversely fixed with respect to said row unit, and an adjustable bracket member connected to the cylinder and mounted for transverse movement along the support structure in substantial unison with the row unit.

19. The invention as set forth in claim 18 wherein the lift cylinder is connected to a closed center hydraulic system.

20. The invention as set forth in claim 17 or 18 wherein at least four individual row units are supported on the main unit support frame and wherein said extension frame means includes a width of support structure for receiving at least two row units.

21. The invention as set forth in claim 20 wherein four row units are supported on the main unit support frame and two row units are supported on the extension frame means.

22. The invention as set forth in claim 17 or 18 further comprising a main transverse auger extending between the first and second ends and journalled for rotation therein, a shaft extending outwardly of the second end and fixed for rotation with the main auger, and an extension auger selectively attachable to the outward extension of the shaft for rotation therewith between the second end and the outward end of the extension frame means when the latter is attached.

23. The invention as set forth in claim 22 wherein the main transverse auger includes flighting means for conveying the crop inwardly from the second end, and wherein the extension auger also includes flighting means for directing the crop inwardly toward the second end into conveying contact with said first-mentioned flighting means to thereby provide substantially continuous crop flow between the main and extension augers.

24. The invention as set forth in claim 17 or 18 wherein the row units comprise cotton harvesting units including an aft end connected to the respective bracket for pivoting about a transverse axis and a fore end extending forwardly of the frame assembly, and wherein the main frame and extension frame means comprise a cross auger frame assembly defining a continuous trough area generally below the continuous support structure.

25. The invention as set forth in claim 24 including four row units supported on the main support frame and two row units supported on the extension frame means.

* * * * *

UNITED STATES PATENT AND TRADEMARK OFFICE
CERTIFICATE OF CORRECTION

PATENT NO. : 4,344,271

DATED : 17 August 1982

INVENTOR(S) : Francis E. Schlueter and Brian E. Kent

It is certified that error appears in the above-identified patent and that said Letters Patent is hereby corrected as shown below:

Column 10, line 45, delete "furthercomprising" and insert -- further comprising --.

Signed and Sealed this

Fifteenth Day of March 1983

[SEAL]

Attest:

Attesting Officer

GERALD J. MOSSINGHOFF

Commissioner of Patents and Trademarks